United States Patent [19]
De Silva et al.

[11] Patent Number: 6,158,639
[45] Date of Patent: Dec. 12, 2000

[54] ARTICLE CARRIER FOR VEHICLE

[75] Inventors: Amesh De Silva, Richmond Hill, Canada; Dennis D. Noonan, Royal Oak; Robert D. Worley, Fenton, both of Mich.

[73] Assignee: Decoma International Inc., Ontario, Canada

[21] Appl. No.: 09/294,893

[22] Filed: Apr. 20, 1999

Related U.S. Application Data

[60] Provisional application No. 60/082,331, Apr. 20, 1998.

[51] Int. Cl.$^7$ ...................................................... B60R 9/00
[52] U.S. Cl. .......................... 224/321; 224/309; 224/322; 296/37.7
[58] Field of Search ................................... 224/315, 321, 224/322, 325, 326, 309, 317; 296/37.7

[56] References Cited

U.S. PATENT DOCUMENTS

| | | |
|---|---|---|
| 4,294,388 | 10/1981 | Wünstel . |
| 5,007,570 | 4/1991 | Himmel . |
| 5,190,198 | 3/1993 | Cucheran . |
| 5,203,483 | 4/1993 | Cucheran . |
| 5,205,453 | 4/1993 | Pudney et al. . |
| 5,326,007 | 7/1994 | Pudney et al. . |
| 5,456,512 | 10/1995 | Gibbs et al. . |
| 5,573,161 | 11/1996 | Stapleton ................................. 224/321 |
| 5,704,524 | 1/1998 | Stapleton ................................. 224/321 |
| 5,715,980 | 2/1998 | Blankenburg et al. . |
| 5,732,864 | 3/1998 | Stapleton ................................. 224/321 |
| 6,050,466 | 4/2000 | Cronce et al. ........................... 224/321 |
| 6,050,467 | 4/2000 | Drouillard et al. ...................... 224/321 |

FOREIGN PATENT DOCUMENTS

92/02385  2/1992  WIPO .

*Primary Examiner*—Stephen K. Cronin
*Attorney, Agent, or Firm*—Pillsbury Madison & Sutro LLP

[57] ABSTRACT

The present invention relates to an article carrier assembly for installation on a generally upwardly facing surface of a motor vehicle. The assembly comprises first and second elongated side rails each having locking member engaging portions. Preferably, the locking member engaging portions are spaced apart apertures, although the present invention is not intended to be limited in such a manner. The side rails mount on the generally upwardly facing surface of the motor vehicle in spaced apart, generally parallel relation. An adjustable cross rail assembly has an elongated cross rail for supporting articles of cargo, a fixed locking member fixedly mounted on one opposing end portion of the cross rail, and a selectively movable locking member movably mounted on the other opposing end portion of the cross rail. The movable locking member is selectively movable between a locked position and an unlocked position. The cross rail assembly mounts in an operative position with the cross rail extending transversely between the side rails, the fixed locking member engaging the engaging portion of the first side rail, and the movable locking member being moved to the locked position thereof and engaging the engaging portion of the second side rail. Together, the fixed and movable locking members cooperate with the locking member engaging portions to prevent longitudinal movement of the cross rail assembly with respect to the side rails. The cross rail assembly can be repositioned longitudinally with respect to the side rails from one side of the vehicle by manually affecting movement of the movable locking member to the unlocked position thereof so as to disengage it from the engaging portion of the second side rail, then moving the cross rail assembly so as to disengage the fixed locking member from the engaging portion of the first side rail, then moving the cross rail assembly longitudinally with respect to the cross rail, and thereafter re-engaging the fixed locking member with the engaging portion of the first side rail and manually affecting movement of the movable locking member into the locked position thereof into engagement with the engaging portion of the second side rail.

13 Claims, 7 Drawing Sheets

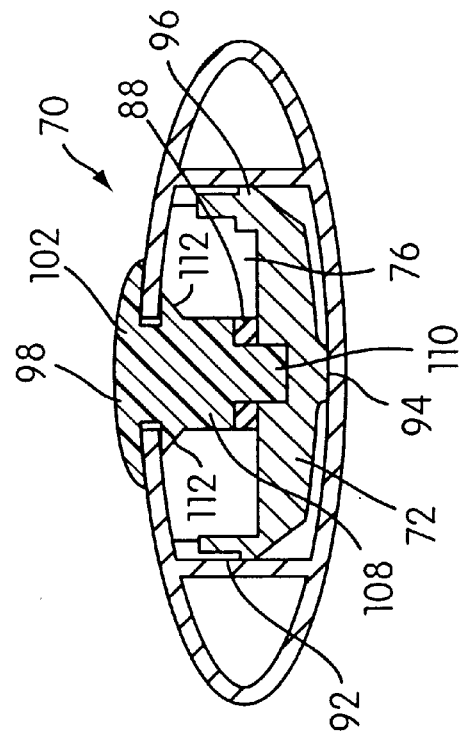
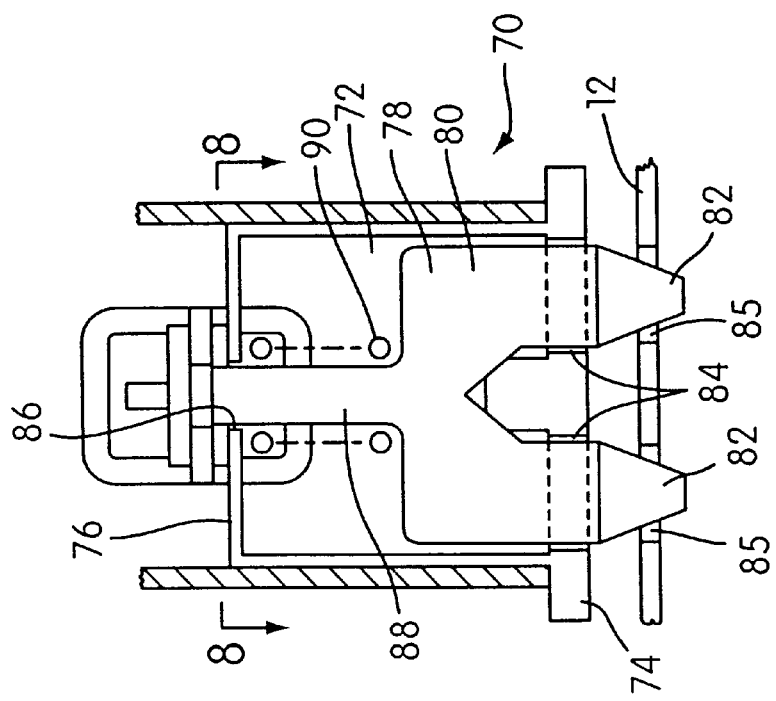

ARTICLE CARRIER FOR VEHICLE

The present application claims priority from U.S. Provisional Application of De Silva, Ser. No. 60/082,331, filed Apr. 20, 1998, the entirety of which is incorporated into the present application by reference.

FIELD OF THE INVENTION

The present invention relates to article carriers that are installed on upwardly facing motor vehicle surfaces, such as roofs and trunks, for carrying articles of cargo. In particular, the present invention relates to article carriers with a cross rail that can be repositioned along a set of side rails from one side of the vehicle.

BACKGROUND OF THE INVENTION

Article carriers are well-known in the art for carrying luggage and other articles of cargo on top of a motor vehicle. The conventional article carrier assembly includes a pair of side rails that mount directly to the vehicle exterior and one or more cross rails that mount transversely across or between the side rails. One or more of the cross rails may be adjustable to accommodate cargo articles of varying sizes.

Typically, to reposition an adjustable cross rail longitudinally with respect to the side rails, the cross rail must be unlocked from each side of the vehicle, moved longitudinally along the side rails, and then re-locked from each side of the vehicle. This situation is rather inconvenient for the vehicle user because of the need for unlocking and re-locking the cross rail from each side of the vehicle.

Recently, there have been proposed article carriers that the vehicle user can reposition longitudinally while remaining on one side of the vehicle. Examples of such article carriers are shown in U.S. Pat. Nos. 5,715,980, 5,190,198, and 5,203,483. In the constructions disclosed by each of these patents, the cross rail has a pair of locking members at opposing ends thereof and an actuating mechanism on one of the opposing ends that affects movement of both locking members.

The problem with the article carriers proposed in the above-mentioned patents is that complicated mechanisms are needed to transmit motion between the actuating mechanism and the locking assembly that is distal from the actuating mechanism. The costs and difficulty associated with manufacturing such complicated mechanisms are rather high in comparison to the conventional assemblies in which the cross rail must be locked and unlocked from both sides of the vehicle.

SUMMARY OF THE INVENTION

It is therefore an object to the present invention to provide an article carrier assembly with a cross rail that can be adjusted from one side of the vehicle and that has a simple and inexpensive design. To achieved this object, the present invention provides an article carrier assembly for installation on a generally upwardly facing surface of a motor vehicle. The assembly comprises first and second elongated side rails each having locking member engaging portions. Preferably, the locking member engaging portions are spaced apart apertures, although the present invention is not intended to be limited in such a manner. The side rails mount on the generally upwardly facing surface of the motor vehicle in spaced apart, generally parallel relation.

An adjustable cross rail assembly has an elongated cross rail for supporting articles of cargo, a fixed locking member fixedly mounted on one opposing end portion of the cross rail, and a selectively movable locking member movably mounted on the other opposing end portion of the cross rail. The movable locking member is selectively movable between a locked position and an unlocked position. The cross rail assembly mounts in an operative position with the cross rail extending transversely between the side rails, the fixed locking member engaging the engaging portion of the first side rail, and the movable locking member being moved to the locked position thereof and engaging the engaging portion of the second side rail. Together, the fixed and movable locking members cooperate with the locking member engaging portions to prevent longitudinal movement of the cross rail assembly with respect to the side rails.

The cross rail assembly can be repositioned longitudinally with respect to the side rails from one side of the vehicle by manually affecting movement of the movable locking member to the unlocked position thereof so as to disengage it from the engaging portion of the second side rail, then moving the cross rail assembly so as to disengage the fixed locking member from the engaging portion of the first side rail, then moving the cross rail assembly longitudinally with respect to the cross rail, and thereafter re-engaging the fixed locking member with the engaging portion of the first side rail and manually affecting movement of the movable locking member into the locked position thereof into engagement with the engaging portion of the second side rail.

Other objects, features, and advantages of the present invention will become apparent from the following detailed description, the accompanying drawings, and the appended claims.

DESCRIPTION OF THE DRAWINGS

In drawings which illustrate embodiments of the invention,

FIG. 7 is a partial sectional view taken longitudinally through the cross rail assembly of FIG. 6;

FIG. 8 is a section view taken along line 8—8 of FIG. 7;

DETAILED DESCRIPTION OF THE PREFERRED EMBODIMENTS OF THE INVENTION

Figure 1:
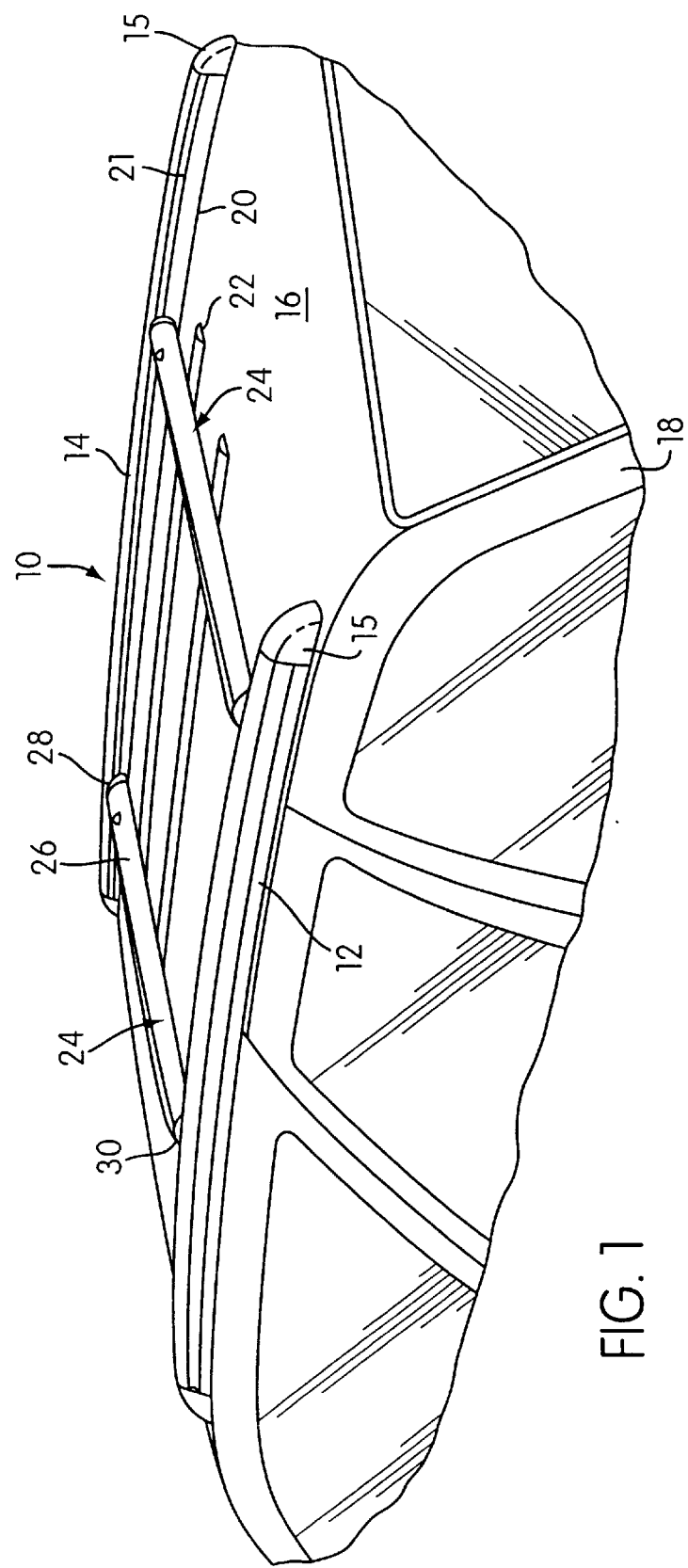
FIG. 1 is a perspective view of a vehicle with an article carrier assembly constructed in accordance with the principles of the present invention mounted on the roof thereof.

FIG. 1 shows an article carrier assembly 10 constructed in accordance with the principles of the present invention. The article carrier assembly 10 includes a pair of elongated side rails 12 and 14 mounted in fixed, spaced relation on an upwardly facing exterior body surface 16 of a motor vehicle 18. In the illustrated embodiment, the article carrier assembly 10 is disposed on the roof panel of the vehicle 18 with the side rails 12 extending longitudinally with respect to the vehicle 18. It can be appreciated that the article carrier assembly 10 may instead be mounted on the outer or exterior surface or the trunk of the vehicle 18 of to the side wall of a pick-up truck bed.

The side rails 12 and 14 each have a hollow cross section and are preferably roll formed. However, other methods of construction, such as extrusion and gas assist injection molding, may also be used to form the side rails 12 and 14. Each side rail 12 and 14 has an end cap 15 at each end thereof and each side rail has an elongated groove 21 extending substantially the length of the inner side wall 20. (Each side rail 12, 14 has a series of apertures (not shown)) formed along the interior of its associated groove and spaced apart in the longitudinal direction of the side rails 12, 14. When the rails 12 and 14 are mounted on the vehicle roof 16 in spaced apart, parallel relation, the grooves 21 and the apertures face generally inwardly towards, one another.

The side rails 12 and 14 may be formed of any suitable material for supporting a load, such as metal, plastic and combinations thereof. Side rails 12 and 14 are adhered or affixed to the body surface 16 in any suitable manner well known in the art.

Protective slats 22 are mounted on the vehicle surface 16 between side rails 12 and 14. The slats 22 are fixed to the exterior body surface 16 in a manner similar to that of the side rails 12 and 14. Cargo items may be placed on the slats 22 and secured to the cross rail assembly 24.

The article carrier assembly 10 includes at least one adjustable cross rail assembly 24 extending transversely between the side rails 12 and 14. In the preferred embodiment, two such assemblies 24 are provided in a spaced relation. It is to be appreciated, however, that any number of such adjustable cross rail assemblies 24 may provided. Further, a stationary cross rail assembly may be provided or may be entirely omitted from the article carrier assembly 10.

Figure 2:
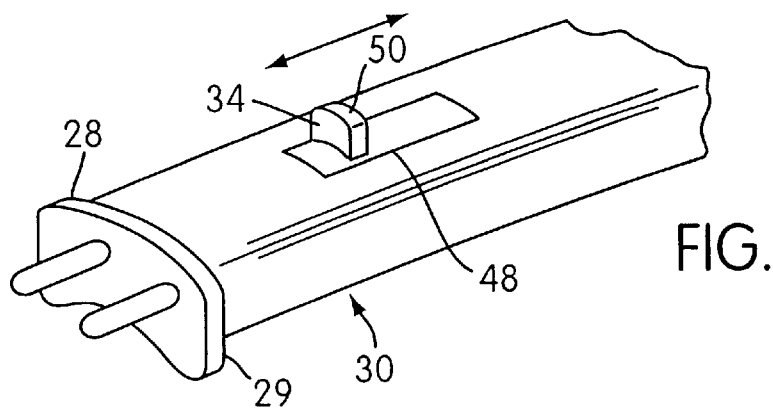
FIG. 2 is a perspective view of the active bracket of the embodiment of FIG. 1.
Figure 3:
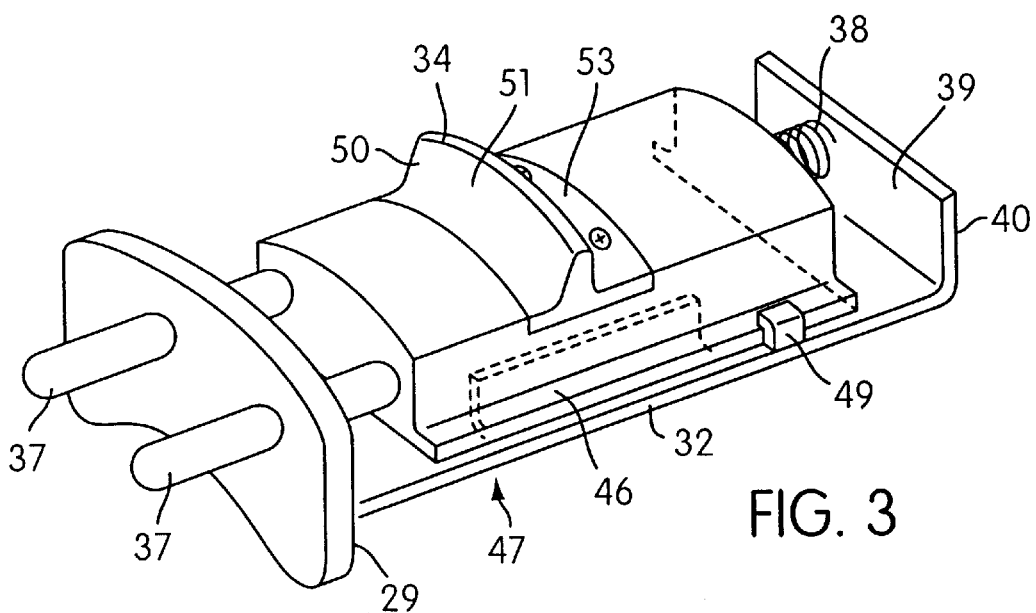
FIG. 3 is a perspective view of the active bracket of FIG. 2 with the locking member thereof in an unlocked position.
Figure 4:
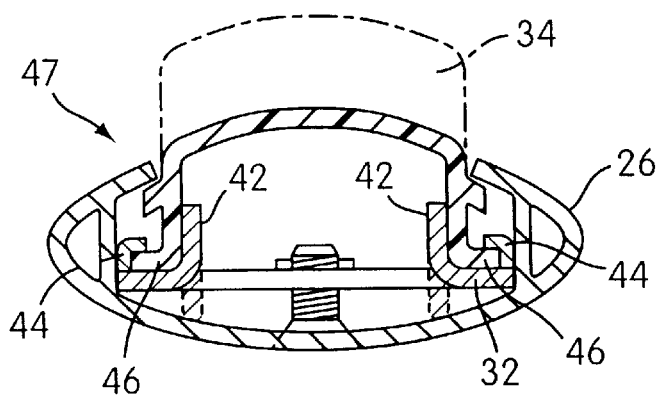
FIG. 4 is an end sectional view of the active bracket of FIG. 3.
Figure 5:
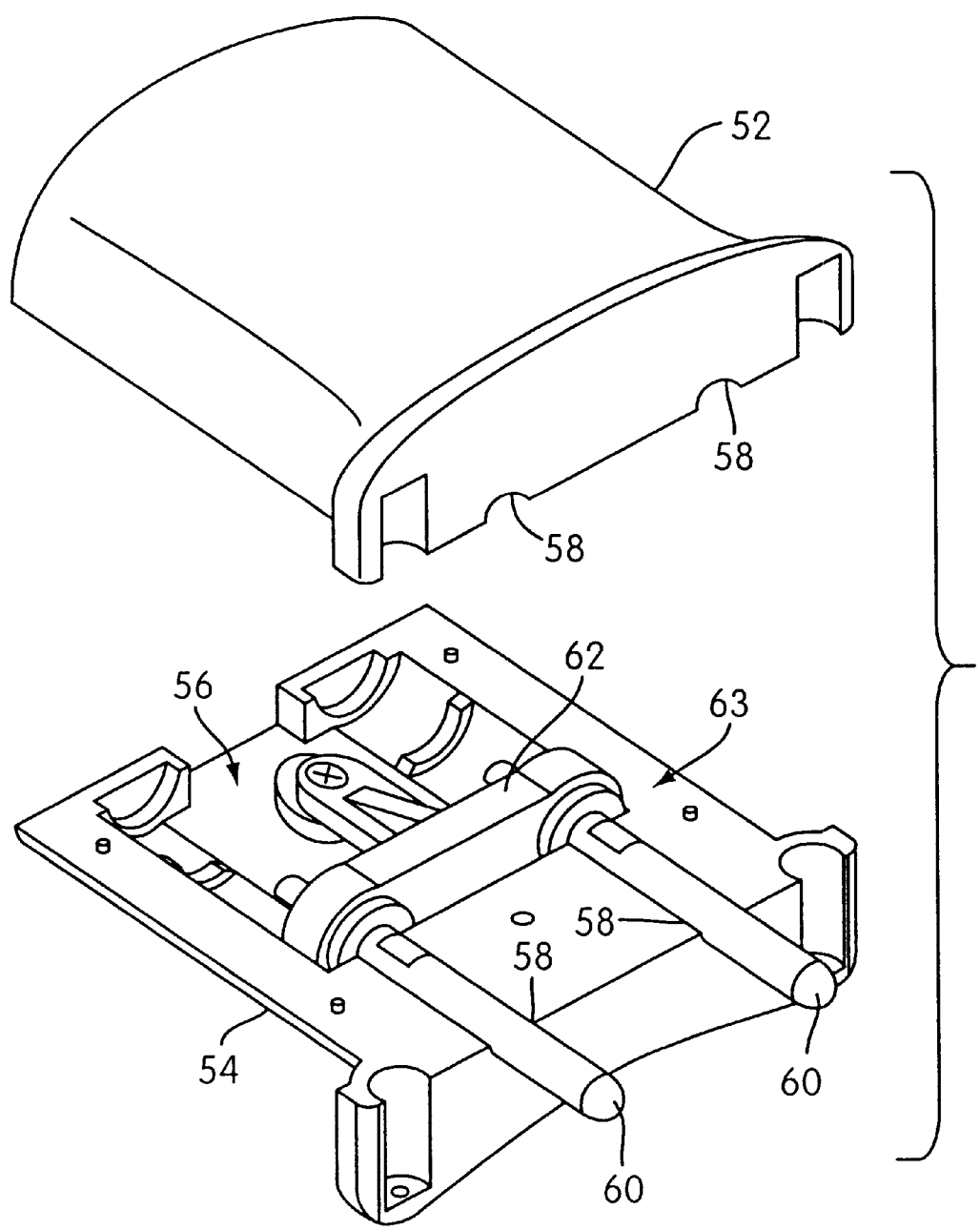
FIG. 5 is an exploded perspective view of the fixed bracket of the embodiment of FIG. 1.

The cross rail assembly 24 comprises a tubular cross rail 26, an active bracket 28 mounted on one opposing end of the cross rail 26, and a fixed bracket 30 mounted on the other opposing end of the cross rail 26. FIGS. 2–4 illustrate the active bracket 28 in closer detail. The active bracket 28 comprises an end plate 29, a base plate 32, a sliding body 34 slidably mounted to the base plate 32, a pair of pins 37 fixedly mounted to the sliding body 34, and a biasing spring 38 engaged with the sliding body and a spring bearing surface 39 on base plate 32.

The end plate 29 closes off the end of the hollow cross rail 26 and has two apertures for slidably receiving pins 37. Depending from the end plate 29 is base plate 32. Base plate 32 has an end flange 40 at an end distal from the end plate 29. In the illustrated embodiment, base plate 32 has a pair of stamped tabs 42 and a pair of tangs 44 for receiving a pair of outwardly extending lips 46 on sliding body 34. The sliding body 34 and locking pins 37 may be considered together to be a selectively movable locking member 47 that moves rectilinearly between a locked position wherein the pins 37 extend outwardly from the end plate 29 and an unlocked position wherein the pins 37 are retracted inwardly from the locked position. The tabs 42 and tangs 44 cooperate to guide the sliding body 34 as the locking member 47 slides between its locked and unlocked positions. The biasing spring 38 biases the movable locking member 47 to the locked position thereof.

Sliding body 34 has a push tab 50 with a manually engageable portion 51 and a connecting portion 53. The connecting portion 53 is affixed to the sliding body 34 by threaded fasteners, adhesives, or any other suitable means such that portion 51 extends generally upwardly from the sliding body 34.

Hollow cross rail 26 has an aperture 48 formed through the upper side thereof. During assembly, active bracket 28 is friction fitted into the end of hollow cross member 26 and then the push tab 50 is affixed to the upper surface of the sliding body 34 so that the manually engageable portion 51 thereof extends generally upwardly through aperture 48.

Fixed bracket 30 has an upper housing 52 and a lower housing 54. In the preferred embodiment, upper housing 52 and lower housing 54 are substantially identical and formed from the same mold to minimize molding and production costs. When assembled together, the housings 52, 54 cooperate to define a central cavity 56 and a pair of generally circular openings 58 for receiving pins 60. A cross plate 62 is fixedly mounted, inside the central cavity 56 to one of the housings 52, 54 and the pins 60 are fixedly mounted to the cross plate 62. Together, the cross plate 62 and pins 60 may be considered a fixed locking member 63 that is immovable with respect to the cross rail 26.

It will be appreciated by one skilled in the art that the fixed locking member 63 may have other constructions, such as those that will be described below with respect to FIGS. 12–14. For example, the cross plate 62 may be omitted to save on parts costs and the pins 60 may be fixed directly to one of the housings 52, 54. When the fixed bracket 30 is assembled together, it is then press fit or friction fit into the open end of the cross rail 26. Adhesives or fasteners may be used to further secure the fixed bracket 30 within the cross rail 26.

The operation of the present invention will be described.

Normally, the cross rail assembly 24 is mounted in an operative position with the cross rail 26 extending transversely between the side rails 12 and 14 in a position suitable for supporting a load. The pins 60 of the fixed locking member are received within the apertures of one of the side rails 12. The movable locking member 47 is moved to the locked position thereof so that its locking pins 37 are received within the apertures on the other side rail 14. In this position, the locking pins 37 and 60 of the movable and fixed locking members 47, 63 cooperate with the apertures on the side rails 12, 14 to prevent longitudinal movement of the cross rail assembly 24 with respect to the side rails 12 and 14. In a broad sense, the apertures may be considered to be locking member engaging portions that engage the fixed and movable locking members 47,63.

The pin/aperture arrangement is not :necessary to the principles of the present invention and any other locking arrangement may be used, although the pin/aperture arrangement is preferred. For example, it is contemplated that other arrangements may be used, such as the deformable gripping structure disclosed in U.S. patent application of Droulliard, Ser. No. 09/054,495, assigned to the assignee of the present application, or the locking arrangement disclosed in U.S. patent application of Reichenberger, Ser. No. 09/054,481, also assigned to the assignee of the present application, the entirety of each being incorporated into the present application by reference.

To release the cross member 26, the user engages the manually engageable portion 51 of push tab 50 and pushes the tab 50 inwardly so as to move the selectively movable locking member 47 inwardly, withdrawing the pins 37 from the apertures in which they were received. The user then pivots the cross rail assembly 24 so as to withdraw the pins 60 of the fixed locking member 63 from the apertures in which they were received. The cross rail assembly 24 can then be moved longitudinally along the side rails 12, 14 to a desired location. The cross rail assembly 24 is reinstalled at the desired location by reversing the above steps. Specifically, the cross rail assembly 24 is moved so as to re-insert the pins 60 of the fixed locking member into a selected pair of apertures on one side rail and then the cross rail assembly 24 is pivoted downwardly so as to position the pins 37 of the movable locking member adjacent a pair of apertures on the other side rail. During this movement, the push tab 50 is kept pushed inwardly so as to maintain the locking member 47 in its unlocked position against the biasing of spring 38. Then, push tab 50 is released, allowing the spring 38 to move the sliding body 34 in a rectilinear manner so as to re-insert the pins 37 into the appropriate apertures, thereby placing the movable locking member 47 in the locked position thereof and securing the cross rail assembly 24 in place.

FIGS. 6–11 show an alternative construction for the selectively movable locking member for the article carrier assembly of the present invention. In FIGS. 6–11, the same reference numerals will be used to denote structures identical or similar to structures in the previously described embodiment.

Figure 6:
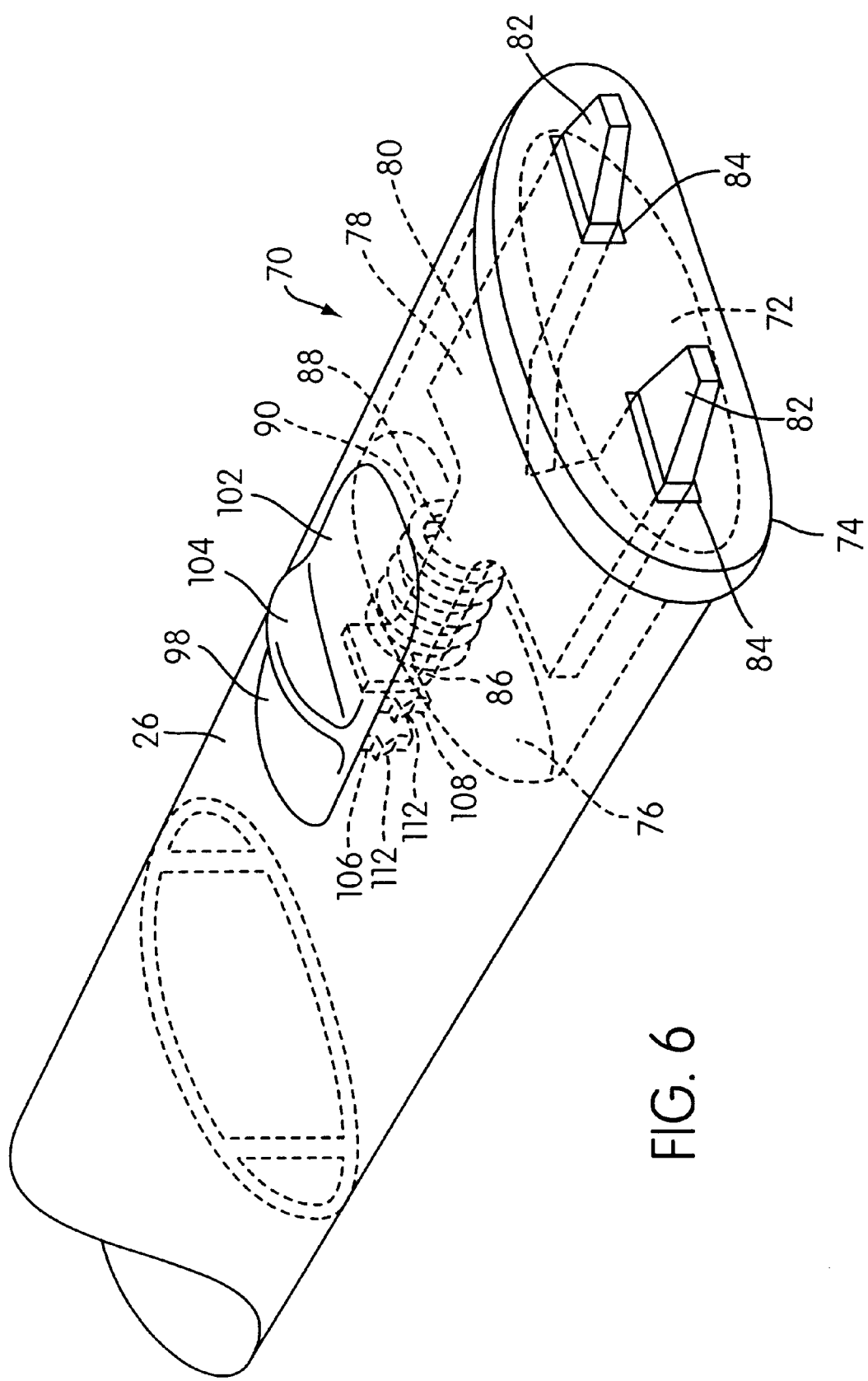
FIG. 6 is a perspective view of an alternative active bracket of the present invention with the cross rail and other elements being depicted as transparent to better illustrate the components of the active bracket.
Figure 11:
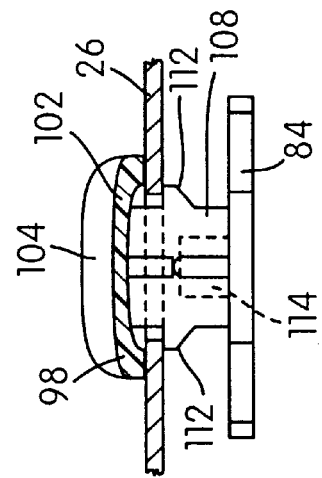
FIG. 11 is a sectional view taken vertically at a point located outwardly of the lock button of FIG. 9.

FIG. 6 shows a perspective view with the tubular cross rail 26 partially shown in a transparent manner to illustrate the components therein. The active bracket 70 of FIG. 6 has a base plate 72 and an end plate 74. The base plate 72 has an upwardly extending flange 76. A moveable locking member 78 is slidably mounted on the base plate 72 and has a main body 80 and a pair of flattened locking pins 82 extending from the body 80. The end plate 74 has a pair of generally rectangular apertures 84 through which the locking pins 92 extend. The flattened locking pins 82 are received in generally rectangular apertures 85 on the side rail 12, as shown in FIG. 7.

The flange 76 has a slot 86 formed therein and the locking member 78 has a rearwardly extending member 88 formed integrally with the main body 80 and extending through the slot 86. A coil spring 80 slides over member 88 and its end volutes engage the main body 80 and the flange 76 so as to bias the locking member 78 outwardly.

As can be best seen in FIG. 8, the active bracket 70 is press-fit into the end of the cross rail 26 with at least three contact points 92, 94, 96 wedging against interior surfaces of the cross rail 26. Additional securement may be provided by using adhesives or fasteners.

Figure 9:
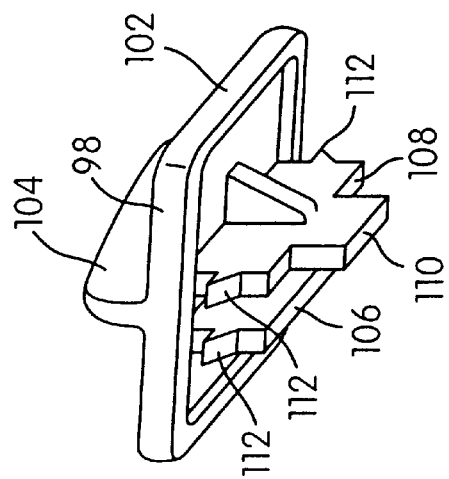
FIG. 9 is perspective view of the lock button used in the active bracket of FIG. 6 taken from the underside thereof.

FIG. 9 shows a lock button 98 for the active bracket 70 taken from the underside thereof. The lock button 98 has a main body 102, an upwardly extending tab 104, and two downwardly extending tabs 106, 108 that are generally parallel to one another. One of the tabs 108 has an additional tab 110 of smaller width extending further downwardly therefrom. Each of the tabs 106, 108 has a pair of triangular wings 112 extending on opposing sides thereof in spaced relation below the main body 102.

Figure 10:
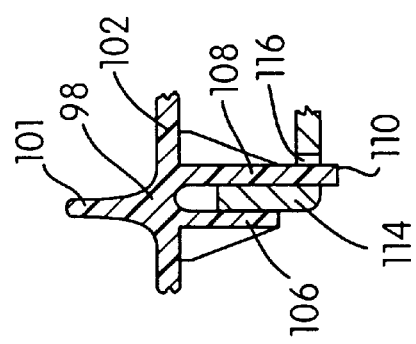
FIG. 10 is a partial sectional view showing the portions where the lock button of FIG. 9 and the movable locking member are joined together.

As best seen in FIG. 10, the free end of the rearwardly extending member 88 on locking member 78 has a bent, upwardly extending tab 114 and an opening 116 adjacent the tab 114. As in the previously described embodiment, the cross rail 26 has an upwardly facing opening 118 former therein. With the base plate 72 and its associated elements press-fit into the cross rail end, the lock button 98 is mounted to the upper exterior of the cross rail 26 with both tabs 106, 18 extending into the cross rail interior and the main body 102 engaging the cross rail 26 exterior. When assembled as such, the upwardly extending tab 114 is received in sandwiched relation between the two tabs 106, 108 of the lock button 98 and tab 110 of lock button 98 received through the opening 116 on rearwardly extending member 88. As a result, manually moving the lock button 98 by engaging a thumb or finger with tab 104 moves the locking member 78 rectilinearly along the base plate 72. The manner in which this active bracket 70 operates is basically the same as the embodiment described above.

It should be noted that the wings 112 engage the interior surface of the cross rail 26 to prevent the lock button 98 to be lifted upwardly. A widened portion (not shown) of opening 118 is provided to allow the wings 112 to pass through into the cross rail interior during assembly.

Figure 12:
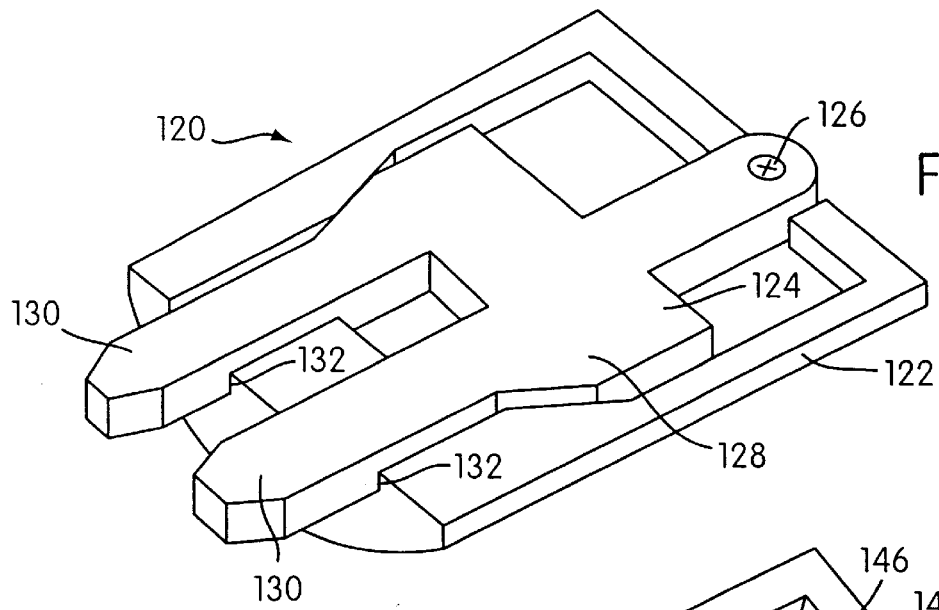
FIG. 12 is a perspective view of an alternative construction for the fixed bracket of the present invention.
Figure 13:
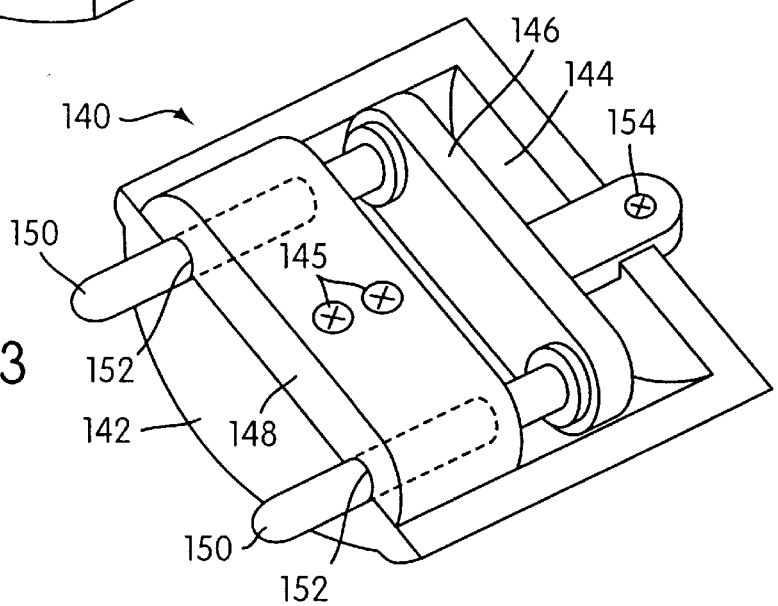
FIG. 13 is a perspective view of a second alternative construction for the fixed bracket of the present invention.
Figure 14:
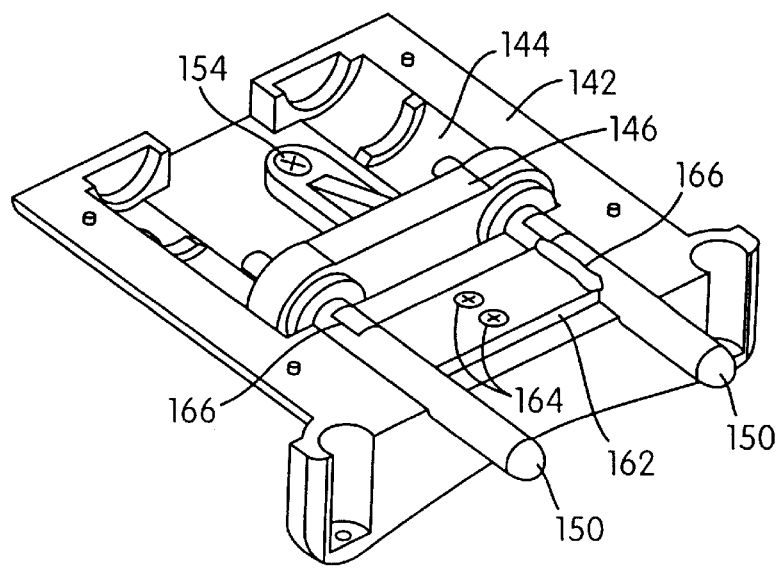
FIG. 14 is a perspective view of a third alternative construction for the fixed bracket of the present invention.

FIGS. 12–14 show three alternative constructions for the fixed bracket for the article carrier assembly of the present invention.

FIG. 12 shows a first alternative embodiment for the fixed bracket 120. The bracket 120 has two housing halve,, only one 122 of which is shown for clarity purposes, and a fixed locking member 124. The fixed locking member 124 is fastened in place by fastener 126 and has a main body 129 with a pair of flattened locking pins 130. The flattened locking pins 130 extend out through rectangular openings 132 in the housing and are received in generally rectangular apertures in a side rail.

FIG. 13 shows a second alternative embodiment for the fixed bracket 140. The bracket 140 has a lower housing portion 142 with a recess 144 for receiving locking member 146. A relatively smaller housing portion 148 is fastened at the end of the lower housing portion 142 and fasteners 145 and retains the cylindrical locking pins 150 of locking member 146 moving upward movement. The housing portions 142, 148 cooperate to define a pair of circular openings 152 for receiving the pins 150. The fixed locking member 146 is immovably fixed at the rear end thereof with a fastener 154.

FIG. 14 shows a third alternative construction for the fixed bracket 160. The bracket 150 is basically the same as a bracket 140 of FIG. 13 except that housing portion 148 is replaced by brace 162, and the lower housing portion 142 has a slightly different configuration. The brace 162 is secured to the lower housing portion 142 by a pair of fasteners 164 and has a pair of arcuate flanges 166 that engage the pins 150 to keep them from moving upwardly away from the lower housing portion 142.

The preceding specific embodiments are illustrative of the practice of the present invention. It is to be understood, however, that other expedients known or apparent to those skilled in the art or disclosed herein may be employed without departing from the spirit of the invention.

In particular, other methods and arrangements of sliding engagement between the slider and the housing are now apparent to those skilled in that art. Additionally, the slider could also incorporate a push button mechanism to prevent the slider from slipping from the locked or engaged condition.

What is claimed:

1. An article carrier assembly for installation on a generally upwardly facing surface of a motor vehicle, said assembly comprising:

first and second elongated side rails each having locking member engaging portions, said side rails being constructed and arranged to be mounted on the generally upwardly facing surface of the motor vehicle in spaced apart, generally parallel relation;

an adjustable cross rail assembly having an elongated cross rail for supporting articles of cargo, a fixed locking member fixedly mounted on one opposing end portion of said cross rail, and a selectively movable locking member movably mounted on the other opposing end portion of said cross rail for selective generally rectilinear movement between a locked position and an unlocked position;

a push tab having a manually engageable portion extending exteriorly of said cross rail and a connecting portion connected to said movable locking member, said push tab being constructed and arranged such that the movable locking member is moved generally rectilinearly between said locked and unlocked positions by manually engaging said manually engageable portion from one side of the vehicle and moving said push tab generally rectilinearly;

said cross rail assembly being constructed and arranged to be mounted in an operative position with said cross rail extending transversely between said side rails in a position for supporting articles of cargo, said fixed locking member being engaged with the engaging portion of said first side rail, and said movable locking member being moved to the locked position thereof and engaged with the engaging portion of said second side rail such that said fixed and movable locking members cooperate with said locking member engaging portions to prevent longitudinal movement of said cross rail assembly with respect to said side rails;

said cross rail assembly being constructed and arranged to be repositioned longitudinally with respect to said side rails from one side of the vehicle by manually affecting movement of said movable locking member to the unlocked position thereof so as to disengage said movable locking member from the engaging portion of said second side rail, then moving said cross rail assembly so as to disengage said fixed locking member from the engaging portion of said first side rail and moving the cross rail assembly longitudinally with respect to said side rails, and thereafter re-engaging said fixed locking member with the engaging portion of said first side rail and manually affecting movement of said movable locking member into said locked position thereof so as to engage said movable locking member with the engaging portion of said second side rail.

2. An article carrier assembly according to claim 1, wherein said cross rail is tubular.

3. An article carrier assembly according to claim 1, wherein the locking member engaging portions of each of said side rails comprises a plurality of apertures spaced apart in the longitudinal direction of their respective side rails and wherein each of the movable and fixed locking members has at least one locking pin that is constructed and arranged to be removably received in one of said apertures.

4. An article carrier assembly according to claim 3, wherein said cross rail assembly includes a fixed spring bearing surface and a spring engaged between said spring bearing surface and said movable locking member, said spring being constructed and arranged to bias said movable locking member to the locked position thereof.

5. An article carrier assembly according to claim 3, wherein said fixed locking member has a pair of said locking pins and wherein said movable locking member has a sliding body slidably mounted to said cross rail and a pair of said locking pins fixedly mounted to said sliding body, said locking pins of each of said fixed and movable locking members being constructed and arranged to be received in adjacent ones of said apertures.

6. An article carrier assembly according to claim 5, wherein said cross rail is tubular.

7. An article carrier assembly for installation on a generally upwardly facing surface of a motor vehicle, said assembly comprising:

first and second elongated side rails each having locking member engaging portions, said side rails being constructed and arranged to be mounted on the generally upwardly facing surface of the motor vehicle in spaced apart, generally parallel relation;

an adjustable cross rail assembly having an elongated cross rail for supporting articles of cargo and a pair of locking members mounted on opposing end portions of said cross rail, said locking members including a selectively movable locking member that moves generally rectilinearly in response to manual operation generally rectilinearly between a locked position and an unlocked position;

a push tab having a manually engageable portion extending exteriorly of said cross rail and a connecting portion connected to said movable locking member, said push tab being constructed and arranged such that the movable locking member is moved generally rectilinearly between said locked and unlocked positions by manually engaging said manually engageable portion of said push tab and moving said push tab generally rectilinearly;

said cross rail assembly being constructed and arranged to be mounted in an operative position with said cross rail extending transversely between said side rails in a position for supporting articles of cargo, said movable locking member being moved to the locked position thereof, and said locking members being engaged with the engaging portions of said side rails such that said locking members cooperate with said locking member engaging portions to prevent longitudinal movement of said cross rail assembly with respect to said side rails;

said cross rail assembly being constricted and arranged to be repositioned longitudinally with respect to said side rails by manually affecting movement of said movable locking member to the unlocked position thereof and disengaging said locking members from the engaging portions of said side rails, moving said cross rail assembly with respect to said side rails, and re-engaging said locking members with said locking member engaging portions.

8. An article carrier assembly according to claim 7, wherein said cross rail is tubular.

9. An article carrier assembly according to claim 7, wherein said locking members include a fixed locking member opposite of said movable locking member.

10. An article carrier assembly according to claim 9, wherein the locking member engaging portions of each of said side rails comprises a plurality of apertures spaced apart in the longitudinal direction of their respective side rails and wherein each of the movable and fixed locking members has at least one locking pin that is constructed and arranged to be removably received in one of said apertures.

11. An article carrier assembly according to claim 10, wherein said cross rail assembly includes a fixed spring bearing surface and a spring engaged between said spring bearing surface and said movable locking member, said spring being constructed and arranged to bias said movable locking member to the locked position thereof.

12. An article carrier assembly according to claim 10, wherein said fixed locking member has a pair of said locking pins and wherein said movable locking member has a sliding body slidably mounted to said cross rail and a pair of said locking pins fixedly mounted to said sliding body, said locking pins of each of said fixed and movable locking members being constructed and arranged to be received in adjacent ones of said apertures.

13. An article carrier assembly according to claim 12, wherein said cross rail is tubular.

* * * * *